Figure 1:
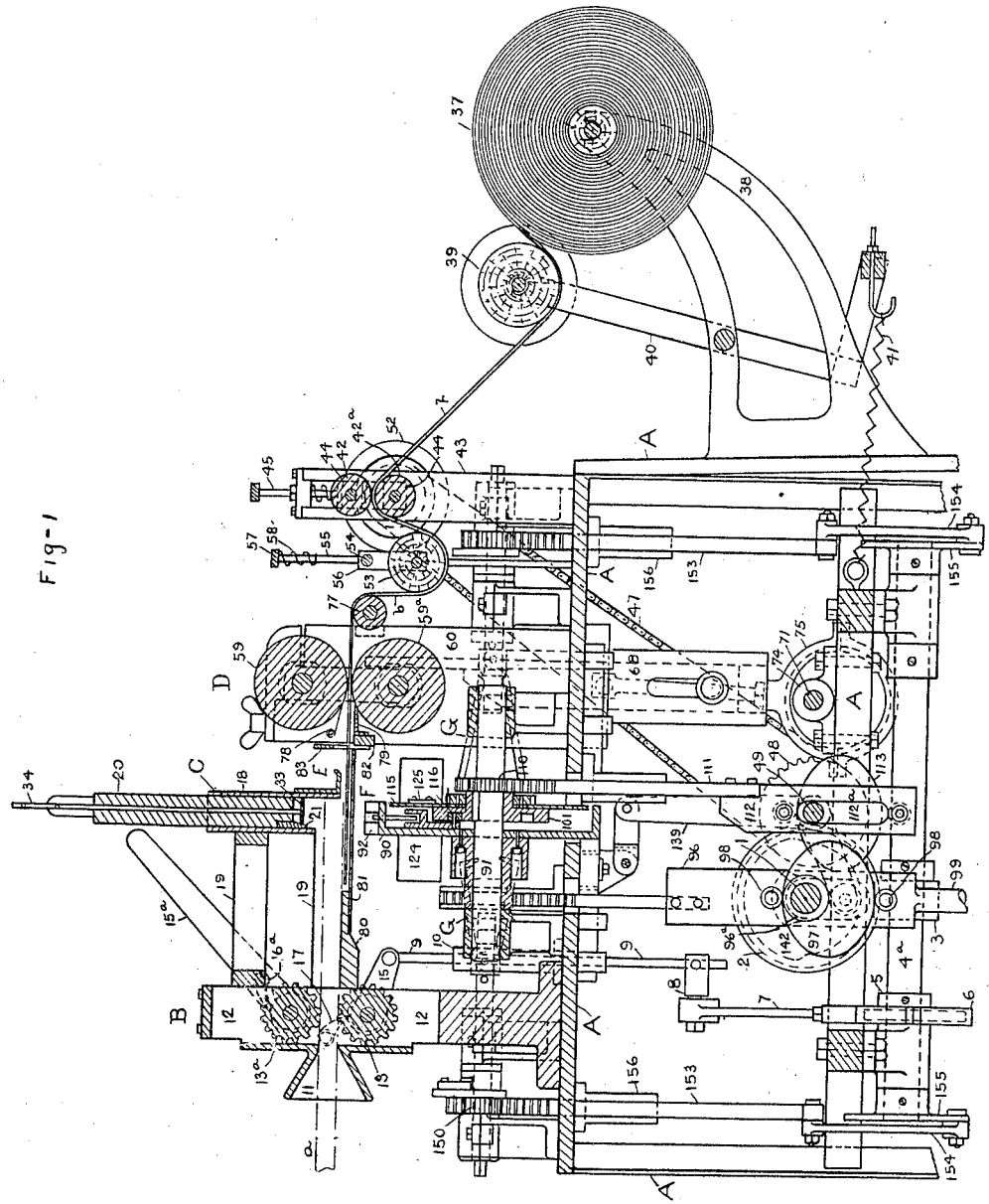

W. J. PENDLEBERRY.
CANDY WRAPPING MACHINE.
APPLICATION FILED MAR. 1, 1909.

964,689.

Patented July 19, 1910.

7 SHEETS—SHEET 1.

WITNESSES:

INVENTOR
William J Pendleberry
BY
Edward A Lawrence
ATTORNEY

W. J. PENDLEBERRY.
CANDY WRAPPING MACHINE.
APPLICATION FILED MAR. 1, 1909.

964,689.

Patented July 19, 1910.
7 SHEETS—SHEET 3.

W. J. PENDLEBERRY.
CANDY WRAPPING MACHINE.
APPLICATION FILED MAR. 1, 1909.

964,689.

Patented July 19, 1910.

7 SHEETS—SHEET 4.

WITNESSES:
Edward H Schane
A B Wakefield

INVENTOR
William J Pendleberry,
BY
Edward A Lawrence
ATTORNEY

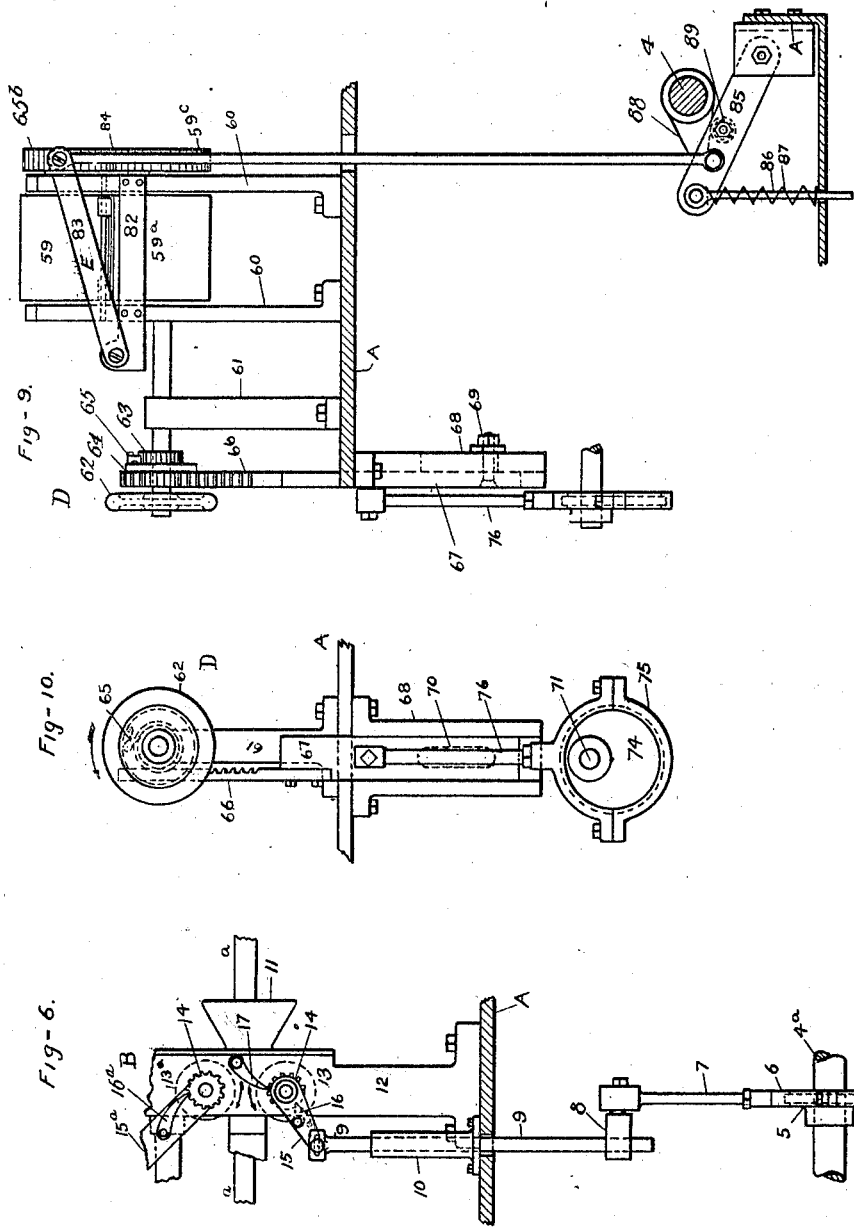

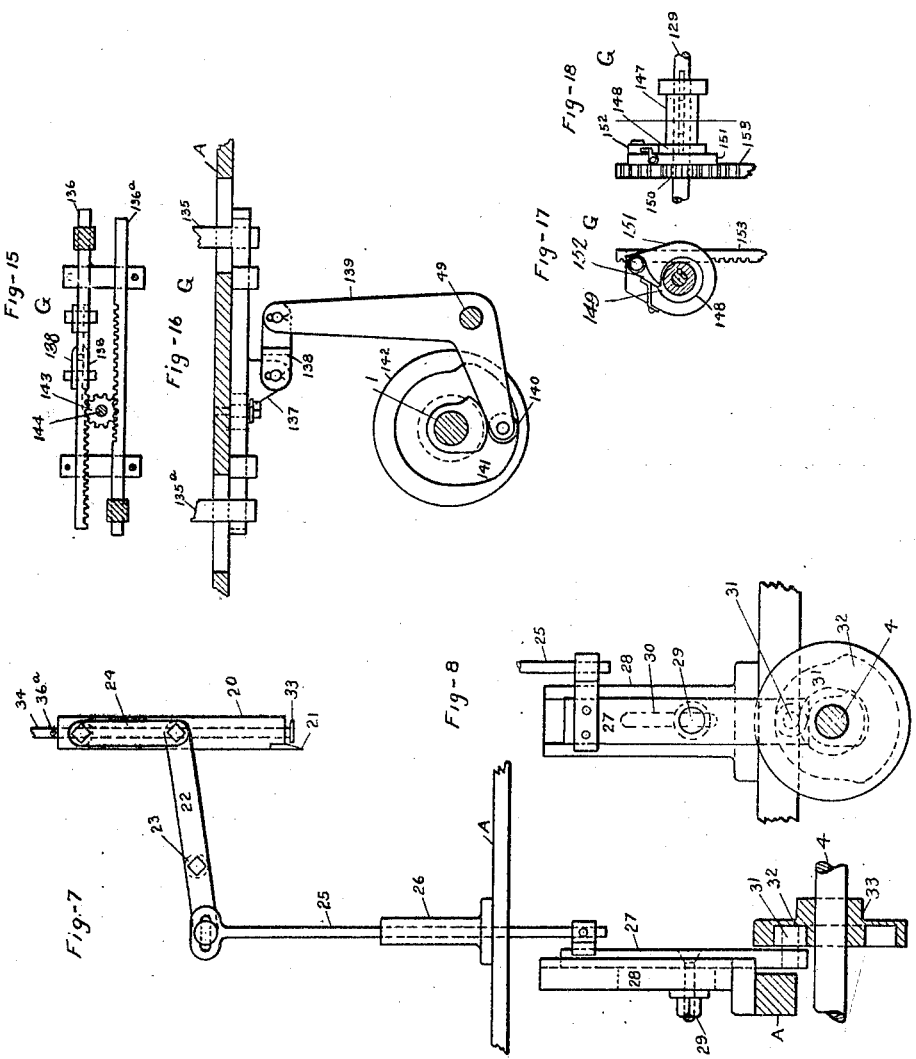

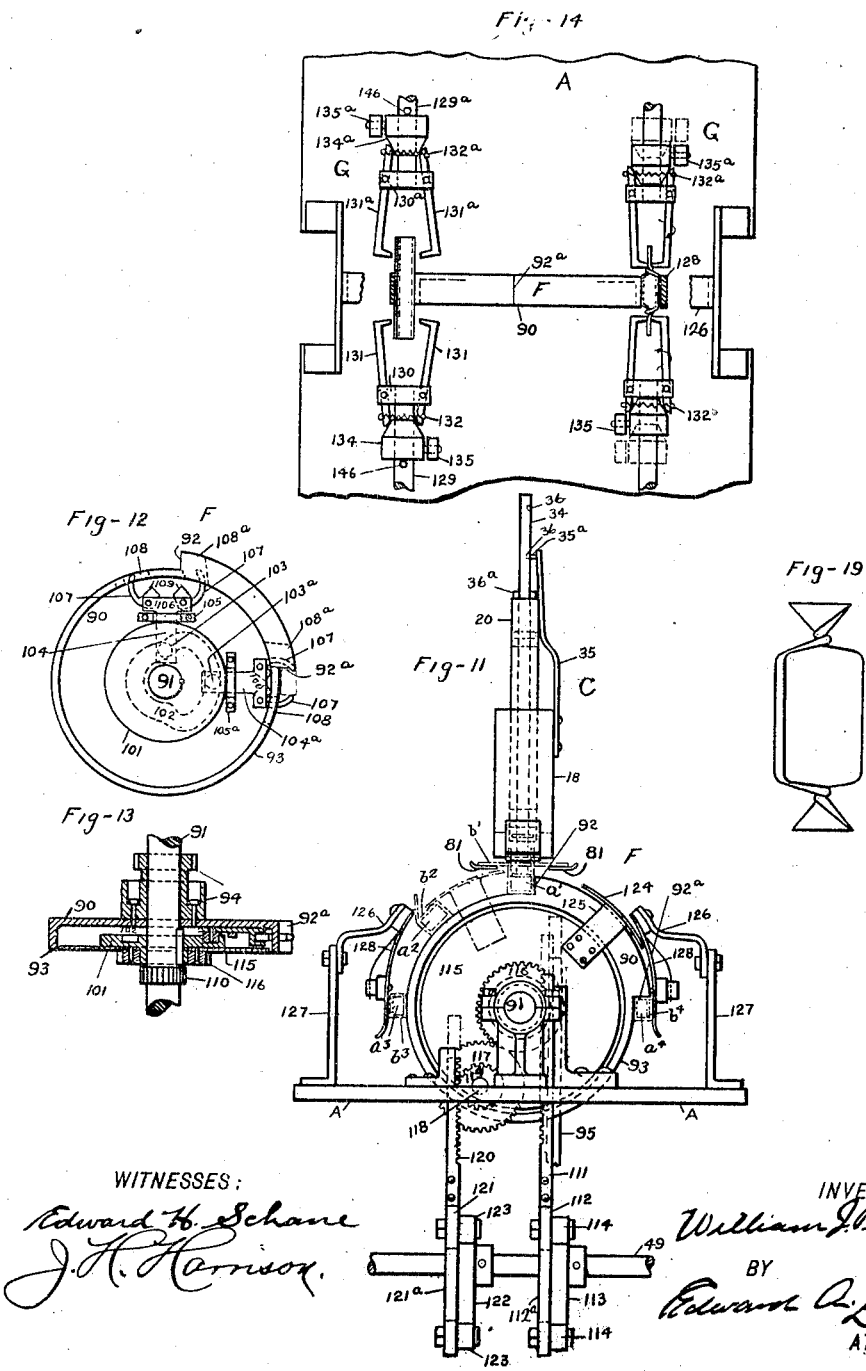

UNITED STATES PATENT OFFICE.

WILLIAM J. PENDLEBERRY, OF KNOXVILLE BOROUGH, PENNSYLVANIA, ASSIGNOR OF ONE-THIRD TO THOMAS H. WALLACE, OF ALLEGHENY COUNTY, PENNSYLVANIA.

CANDY-WRAPPING MACHINE.

964,689.

Specification of Letters Patent.    Patented July 19, 1910.

Application filed March 1, 1909. Serial No. 480,571.

To all whom it may concern:

Be it known that I, WILLIAM J. PENDLEBERRY, a citizen of the United States, and residing in the borough of Knoxville, in the county of Allegheny and State of Pennsylvania, have invented or discovered new and useful Improvements in Candy-Wrapping Machines, of which the following is a specification.

My invention consists of new and useful improvements in machines intended for use in cutting candy into sections or pieces and wrapping or inclosing the same in paper wrappers.

I have illustrated the invention in the accompanying drawings as applied to a machine for the production of candy "kisses," which are small pieces of taffy with a paper wrapper folded about the same, the ends of the wrapper being twisted, but the invention is equally applicable to the production of stick candy, or caramels where the wrapper is folded only and not twisted, or any other form of candy pieces inclosed in a wrapper or covering of any kind.

Generally speaking my machine consists of means for feeding in the candy strip, preferably by a step by step movement; means for feeding in the wrapper paper, also preferably by a step by step movement; means for cutting the candy strip into sections of the proper length and stripping said section from the candy knife; means for shearing the wrapping paper into sections of the desired length and feeding said sections underneath the candy sections; oscillating means for folding the wrapper laterally about the candy and delivering the candy piece and wrapper to the mechanism for making the final fold or twist to the wrapper to complete the inclosure of the candy.

I have shown in the drawings, twisting mechanism, in duplicate, for twisting the unfolded ends of the wrapper but it will be understood that the final operation may be that of folding instead of twisting, by the substitution of a folding mechanism of any convenient form for the twisters.

I have shown an oscillating disk which receives the candy sections, superimposed on their wrappers, from the cutting and shearing devices, and alternately delivers the same to the twisters which are in duplicate at either side of the machine. I have also shown a fixed folder adjacent to either side of the oscillating disk, coöperating with a moving folder which oscillates from one side of the disk to the other. I have also shown means interposed between the candy cutting mechanism and the oscillating disk which operates to turn the lateral edges of the wrapper up into a vertical plane so that they may be folded flat on the candy section by the said folders.

Many other novel constructions and arrangements of parts will appear from the following description.

Figure 2:
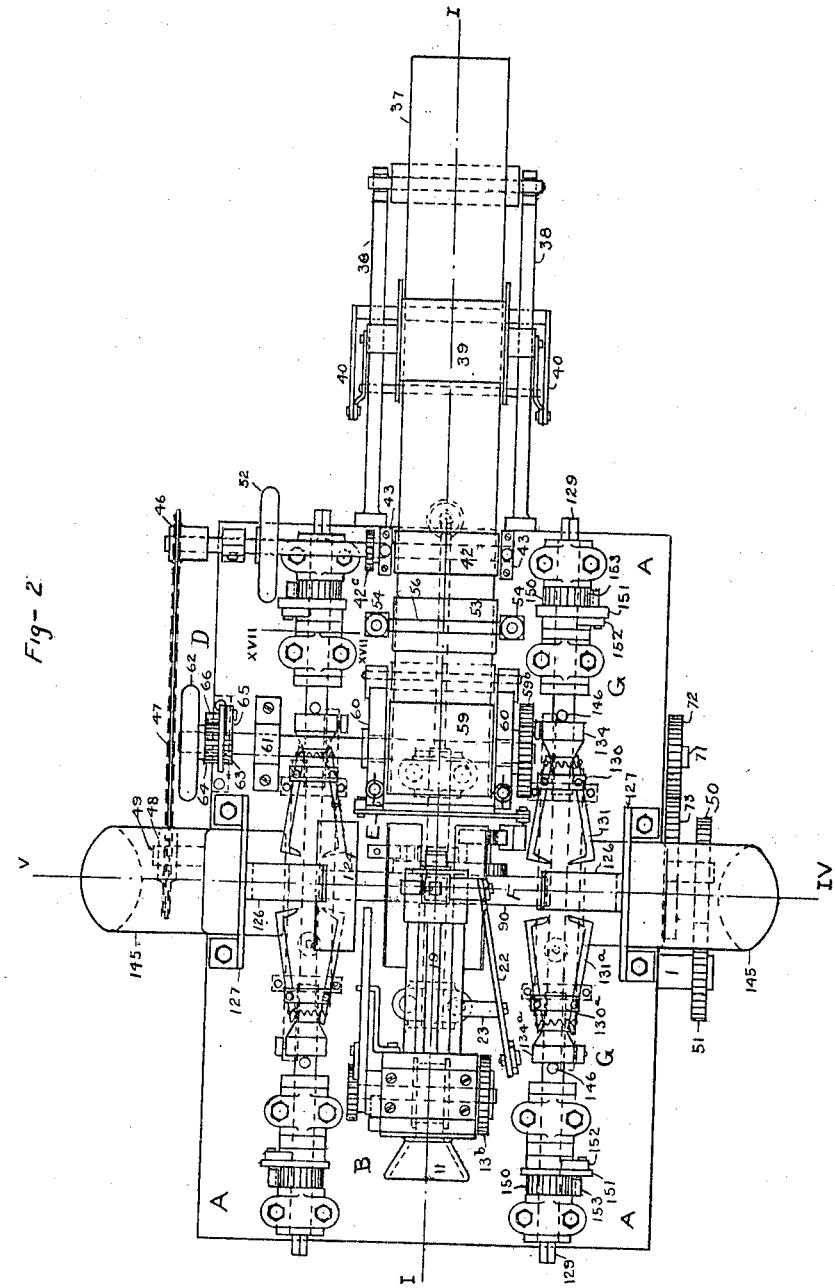
Figure 3:
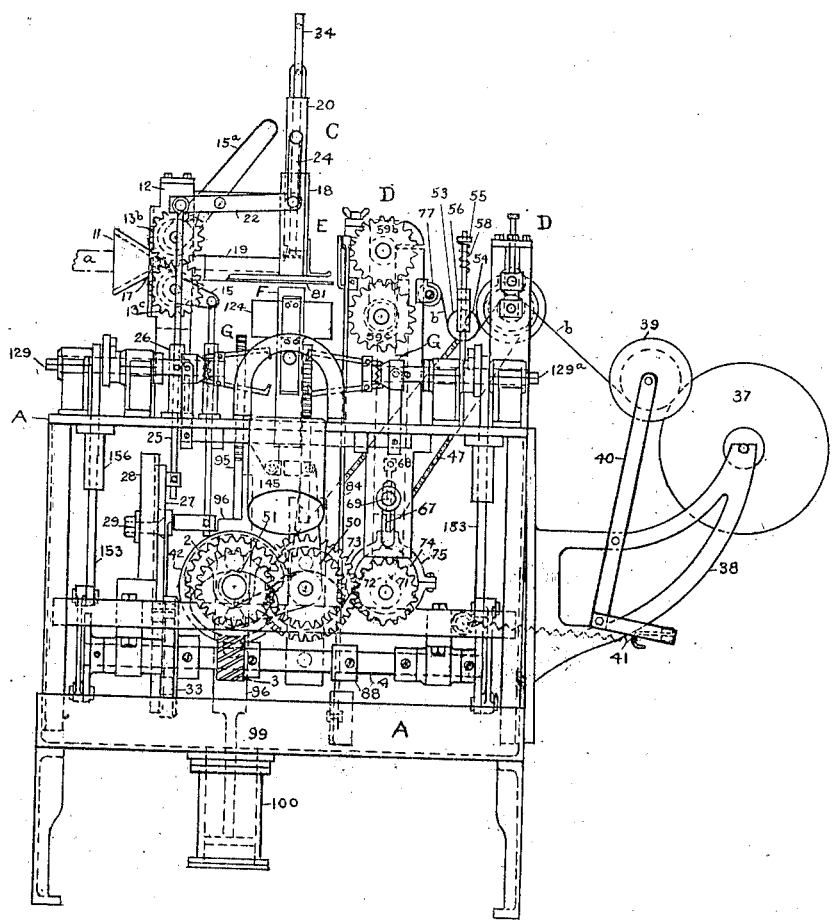
Figure 4:
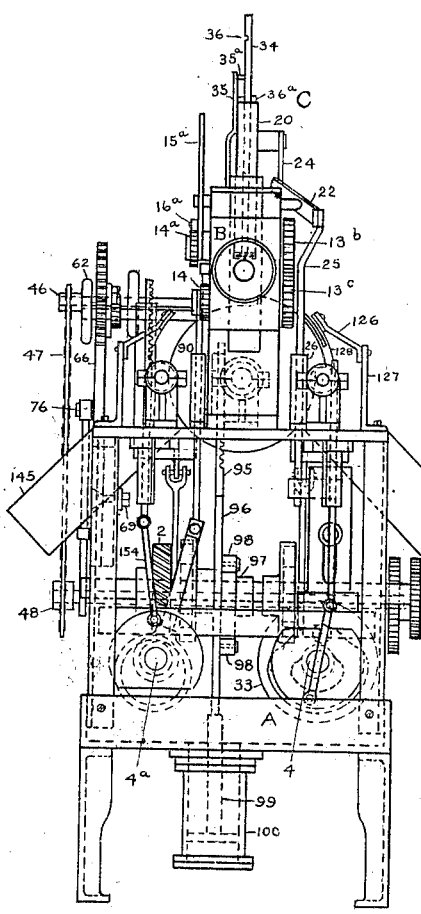
Figure 5:
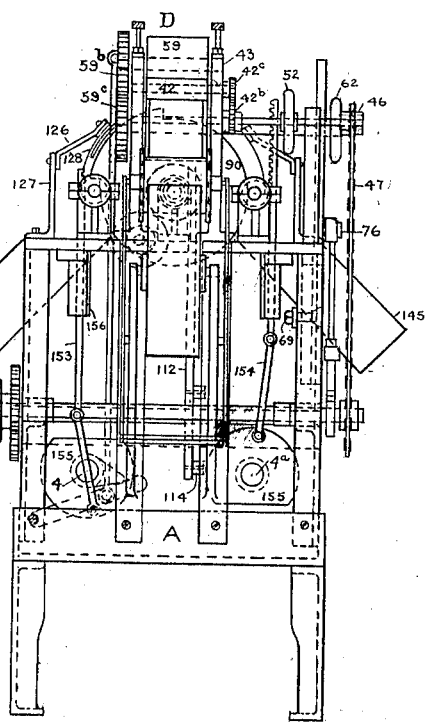

In the accompanying drawings, Figure 1 is a vertical section of the machine along the line I—I in Fig. 2, looking toward the left; Fig. 2 is a plan view of the machine; Fig. 3 is a reduced side elevation; Fig. 4 is a reduced vertical section of the machine along the line IV—V in Fig. 2 looking toward the candy feeding mechanism, and Fig. 5 is a similar section looking in the opposite direction; Fig. 6 is an enlarged detail of the candy feeding mechanism; Fig. 7 is a detail of the candy cutting mechanism; Fig. 8 is a front view of the lower portion of the mechanism shown in Fig. 7; Fig. 9 is a detail of the step by step paper feeding rolls; Fig. 10 is a side view of the same with the rolls omitted; Fig. 11 is a front view in detail of the candy cutting mechanism, oscillating disk and folders; Fig. 12 is a separate view of the oscillating disk with the closing plate removed; Fig. 13 is a horizontal section of the disk as shown in Fig. 11; Fig. 14 is a plan view showing the oscillating disk and twisters; Fig. 15 is a detail plan showing the racks operating the twister shafts longitudinally; Fig. 16 is a side elevation of the same; Fig. 17 is a vertical section along the line XVII—XVII in Fig. 2, showing means for rotating the twister shafts, and Fig. 18 is a side view of the same; Fig. 19 is an enlarged plan view of a completed candy "kiss."

The following is a description of the drawings, which, however, are merely intended to illustrate a practical embodiment of the principles of my invention and not intended to limit the scope thereof to the construction shown.

The various portions of my machine are mounted on and in a table or main frame A.

B. represents the candy feed mechanism; C. the candy cutting mechanism; D. the paper feeding mechanism; E. the paper shearing mechanism; F. the candy disk mechanism, and G—G the twisting mechanism.

The table A is provided with a transverse shaft 1 journaled horizontally in the lower portion of the table and adapted to be operative connected with a source of power, such as a dynamo, not shown.

2—2 are a pair of worm gears rigidly mounted on shaft 1 and meshing respectively with corresponding gears, 3—3, which are mounted, respectively, on longitudinal shafts 4 and $4^a$.

The candy feeding mechanism B is driven by means of an eccentric 5 on shaft $4^a$ on which is mounted a strap 6 provided with a standard 7 in which is mounted a pivot block 8 provided with a rod 9 sliding in fixed sleeve 10. 11 is the candy head mounted in frame 12 in which are also mounted the feed rolls 13 and $13^a$.

14 is a gear rigidly mounted on the extended shaft of roll 13 and 15 is a lever loosely mounted on said shaft and provided with a pawl 16 engaging the teeth of gear 14. The lever 15 is pivotally connected with rod 9 and the depression of said rod results in a step by step rotation of roll 13 in the direction of the arrow in Fig. 6. Pawl 17 prevents the rotation of said roll in the wrong direction. A hand lever $15^a$ is provided with a pawl $16^a$ which engages a gear $14^a$ on the prolonged shaft of roll $13^a$ to enable the candy strip $a$ to be fed into the rolls by hand to start the machine.

I will now describe the candy cutting mechanism, C.

18 is a vertical head supported by any convenient means from the table A, as by the horizontal braces, 19—19, extending from frame 12.

20 is a cutter bar slidably mounted in head 18 and provided at its lower end with a knife 21.

22 is a lever pivoted intermediate of its ends to a fixed point on table A, as at 23.

24 is a link substantially vertical, one end of which is pivoted to the end of lever 22 and the other end pivoted to bar 20.

25 is a rod slidably mounted in vertical sleeve 26 secured to table A. The upper end of rod 25 is connected by a lost motion pivot to the end of lever 22. The lower end of rod 25 is attached to slide 27 which is mounted in guide 28 secured to frame A. A bolt 29 passing through guide 28 engages a vertical slot 30 in slide 27 to retain the slide in the guide. The lower end of slide 27 is provided with a roller 31 which moves in the cam groove 32 in the face of disk 33, which is rigidly mounted on the shaft 4. It is evident that the rotation of shaft 4 will alternately raise and lower the knife 21, thus cutting the candy strip, $a$, into sections such as candy "kisses," $a^1$, $a^2$ &c. (Fig. 11.)

$33^a$ is a stripper plate mounted on the lower end of a vertical rod 34 which is slidably mounted in the hollow cutter bar 20 and extends above said bar.

35 is a leaf spring secured at its lower end to head 18 and having its upper end provided with a horizontal finger $35^a$ adapted to enter a socket 36 in the rod 34, thus holding the stripping plate $33^a$ down against the severed portion of the candy strip until the knife 21 is elevated out of contact and engagement therewith. The upper end of leaf spring 35 is bent inwardly toward the rod 34 so that when the knife 21 has ascended sufficiently to clear the candy, the upper end of cutter bar 20, engaging said leaf spring, forces the same outwardly so that the finger $35^a$ is disengaged from the socket 36 in the rod 34.

$36^a$ is a pin transfixing rod 34 at the proper height, so that when said finger $35^a$ is disengaged, the upper end of the cutter bar 20 engages the said pin $36^a$ and raises the stripping plate $33^a$ out of the way of the candy strip which is now fed under the knife 21. The candy after being severed is thus held down by the stripping plate until the knife is disengaged.

I will next describe the paper feeding mechanism, D.

37 is a roll of oiled or other suitable paper for candy wrapping, mounted on standards 38—38 secured to table A.

39 is an idle guide roll journaled in a swinging frame 40 pivotally mounted on brackets 38—38, and spring actuated, as shown at 41, to exert a constant downward pressure on the paper $b$ as it feeds from the roll 37 thus preventing the occurrence of slack.

42 and $42^a$ are a pair of rolls, horizontally journaled in standards 43—43 mounted on table A, the upper roll 42 being directly journaled in sliding boxes 44—44 mounted in said standards, which boxes are provided with spring tension devices 45 and 45 whereby the rolls obtain a proper grip on the paper $b$. The shaft of the lower roll $42^a$ is prolonged beyond the standard 44 and provided with a sprocket wheel 46 which is operatively connected by chain 47 with a similar sprocket wheel 48 rigidly mounted on a shaft 49 journaled transversely in the lower portion of table A adjacent to and parallel with shaft 1. The shaft 49 is power driven by means of its rigidly mounted gear 50 which meshes with a similar gear 51 rigidly mounted on the main power shaft 1. A hand wheel 52 is provided for the shaft of said roll $42^a$ so that the paper $b$ may be fed into the machine by hand before the machine in general is started.

$42^b$ and $42^c$ respectively represent intermeshing gears rigidly mounted on the shafts of rolls 42 and $42^a$, respectively, thus applying power also to roll 42.

53 is an idle roll in advance of rolls 42 and $42^a$, whose shaft is journaled in boxes 54—54 mounted to vertically slide on rods 55—55 extending from table A. 56 is a cross head connecting said boxes above said roll. 57 is a nut engaging the threaded end of one of said rods 55 having suspended therefrom a spring 58 coiled about said rod and intended to limit the upward motion of said roll but contacting with cross head 56. The paper $b$ is led beneath the sliding roll 53 so that said roll by rising and falling takes up the slack between constant rotating rolls 42 and $42^a$ and the step by step rolls 59 and $59^a$ whose construction and operation I will now describe. These last named rolls are horizontally journaled in standards 60—60 mounted on table A. The shaft of the lower roll $59^a$ is extended through one of said standards 60 and is provided with a third supporting standard, 61, also mounted on table A. Said shaft is provided at its extremity with a hand wheel 62 to enable the paper $b$ to be fed through the rolls 59 and $59^a$ before the machine is put into general operation. Adjacent to hand wheel 62, said shaft is provided with a rigidly mounted gear 63 and a loosely mounted gear 64.

65 is a pawl pivoted to the face of gear 64 and adapted to engage the teeth of gear 63 so that when the gear 64 is rotated in the direction of the arrow in Fig. 10, the said pawl 65 engaging the teeth of gear 63 causes it to revolve with gear 64, but when the gear 64 is rotated in the direction reverse to the arrow, the pawl trips over the teeth of gear 63 without rotating said gear. Thus the roll $59^a$ is rotated by means of the gear 64 and the operative mechanism to be described, in the direction of the arrow only.

$59^b$ and $59^c$ represent intermeshing gears respectively mounted on the shafts of the rolls 59 and $59^a$, thus imparting motion to roll 59. Rotation in alternate directions is imparted to gear 64 by means of a vertical rack 66 which meshes with said gear and is secured at its lower end to a slide 67 mounted in guide 68 in which it is retained by means of bolt 69 passing through said guide and engaging a slot 70 in said slide 67.

71 is a shaft journaled in the base of table A parallel with shaft 49 and rotated therefrom by means of intermeshing gears 72 and 73, respectively mounted on shafts 71 and 49.

74 is an eccentric rigidly mounted on shaft 71, and 75 is a strap encircling said eccentric. 76 is a connecting rod mounted on said strap 75 and pivoted at its upper end to slide 67, whereby a reciprocating motion is imparted to the rack 66 which in turn imparts rotation in alternate directions to the gear 64, which rotation, as above described, results in step by step, or intermittent, rotation of the rolls 59 and $59^a$ as shown by the arrows in Fig. 10.

77 is an idle roll, suitably journaled from table A and leading the paper $b$ into rolls 59 and $59^a$.

78 is a pivoted, spring actuated stripper plate in front of roll 59 to prevent the paper $b$ from winding about said roll, and 79 is a fixed stripper plate mounted in front of roll $59^a$ for the same purpose, said plates serving to hold the paper $b$ in proper horizontal alinement when passing from said rolls and being sheared.

80 is a table extending from frame 12 toward the zone of the knife 21, and 81—81 are parallel plates extending from the table 80 on each side of the zone of said knife, to a point adjacent to the guide plates 78 and 79, the outer, lateral edges of said plates 81—81 being preferably upwardly curved to hold the paper against lateral movement, as shown in Fig. 11.

I will now describe the paper shearing mechanism, E.

82 is a fixed blade mounted horizontally on standard 60—60 and abutting against the fixed plate 79.

83 is a swinging blade, adapted to coöperate with fixed blade 82 and pivoted therefrom. The free end of blade 83 is in turn pivotally connected with the upper end of connecting rod 84 whose lower end is pivoted to the lever 85 intermediate of the ends of said lever. One end of the lever 85 is pivoted to a portion of the table A, while the other end of said lever 85 is pivoted to the plunger rod 86 passing down through a portion of said table A.

87 is a spring, coiled about plunger 86, its lower end bearing against table A and its upper end bearing against the pivoted end of the plunger 86. The spring 87 thus tends to normally hold elevated the blade 83 out of contact with the blade 82, so that the paper $b$ can be advanced between said blades.

88 is a cam fixed on the shaft 4 and adapted to strike against a roller pin 89 mounted on the side of lever 85. The rotation of said shaft 4 and cam 88 will drive lever 85 down against the action of spring 87 once in every revolution of shaft 4, thus drawing pivoted blade 83 sharply down into coöperation with fixed blade 82 and shearing a section of the proper length from the paper $b$.

I will now describe the oscillating candy disk mechanism F, which receives the portion of candy from the candy cutting mechanism resting upon a section of paper from the paper shearing mechanism, and delivers said portion with the paper folded about the same to the twisters, alternately at either side of the machine.

90 is a disk loosely mounted on shaft 91 suitably journaled on table A. A portion of said disk is of enlarged radius thus forming two shoulders 92 and 92ª at somewhat less than 90° apart. The perimeter of said disk 90 is formed by a circumferential flange 93. Also rotatably mounted on shaft 91 and bolted or otherwise secured to disk 90 is an annular gear 94 which is engaged by a vertical rack 95 extending up through table A and attached at its lower end to a plate 96, (Fig. 1) provided with a vertical slot, 96ª, through which passes the shaft 1.

97 is a cam rigidly mounted on shaft 1 and 98—98 represent rollers carried by plate 96 and engaging said cam 97 from both above and below so that the rotation of said cam imparts vertical reciprocation to said plate 96 and also to rack 95 thus rotating gear 94 and with it disk 90 alternately in either direction. This oscillation consists in substantially a quarter turn to disk 90. 99 is a plunger secured to the lower end of plate 96 and provided at its lower end with a piston working in air cylinder 100, whereby the jar of operation is removed from said disk and the machine in general.

101 is a wheel rigidly mounted on shaft 91 within the plane of the perimeter 93 of disk 90 and provided on its inner face with a cam groove 102. 103—103ª represent two rollers seated in said groove 102 and mounted on standards 104 and 104ª, respectively, said standards being slidably secured to the inner face of disk 90 by means of straps 105—105ª. The free ends of standards 104 and 104ª are provided with cross heads 106—106 having bifurcated ends in which are pivoted the fingers, 107—107, whose outer extremities are adapted to be forced out through the apertures 108—108 and 108ª—108ª in the perimeter of the disk 90. The apertures 108ª—108ª are formed through the shoulders 92—92 as shown in Fig. 12. The inner ends of fingers 107—107 are provided with angular projections 109—109 which when the standards 104 or 104ª are forced outwardly by the action of its roller in the cam groove of wheel 101, strike against the portion of the perimeter of the disk 90 between the pair of slots 108 and 108ª causing the fingers 107—107 carried by said standard to swing together their outer ends so that the candy portion or "kiss" may be grasped and held by the fingers while the disk oscillates to deliver the same to the twisters on the proper side.

110 is a gear rigidly mounted on shaft 91 beyond the open face of disk 90 and 111 is a rack engaging said gear and extending down through the top of table A. The lower end of rack 111 is secured to a plate 112 which is provided with a vertical slot 112ª through which the shaft 49 extends.

113 is a cam rigidly mounted on shaft 49, and 114 and 114 are two rollers carried by plate 112 and engaging said cam 113 from above and below. It is thus evident that the rotation of shaft 49 will reciprocate the rack 111 and in turn oscillate the wheel 101. It is evident that the oscillation of said wheel 101 will cause the fingers 108—108 to be extended and retracted alternately as the disk 90 oscillates from side to side. The assemblage of parts is such that when the shoulder 92 is on top the fingers 107—107 of standard 104 are retracted but when the candy "kiss" $a^1$ laid upon its paper square $b^1$ is dropped down on the perimeter of the disk adjacent to the shoulder 92, the fingers 107—107 by the rotation of the wheel 101 are forced outwardly and toward each other so that they grasp the "kiss" $a^1$, the sides of the paper $b^1$ being folded up vertically when the "kiss" drops down between the plates 81—81 onto the perimeter of the disk.

115 is a circular plate, loosely closing the open face of disk 90 and secured to an annular gear 116 loosely mounted upon shaft 91.

117 is a gear, meshing with gear 116, and mounted on short shaft 118 journaled on table A. 119 is a small gear also mounted on said shaft 118 and engaged by a vertical rack 120 which extends down through the top of table A and is secured to a plate 121 provided with a vertical slot, 121ª, through which the shaft 49 extends. 122 is a cam rigidly mounted on said shaft 49 and engaged from above and below by rollers 123—123 mounted on plate 121, whereby a vertically reciprocating motion is imparted to rack 120 and an oscillating motion is imparted through the gears described to the plate 115.

124 is a folder plate curved to correspond to the perimeter of the disk 90 and mounted on an arm 125 secured to plate 115. It is evident that the folder will oscillate along the perimeter of the disk 90.

126—126 represent a pair of stationary folders, made of resilient material, and mounted one on each side of the disk 90 and consisting of plates supported by standards 127—127. 128—128 represent leaf springs which add to the resiliency of said stationary folders.

I will now describe the twisters, F—F, two sets of which are provided, one on each side of the disk 90, and each set consisting of two opposing twisters. I will describe a single set, as illustrative of the construction provided on both sides of the machine.

Journaled on the table A in longitudinal alinement are a pair of shafts 12 and 129ª, provided at their adjacent ends with cross heads 130 and 130ª, respectively.

131—131 and 131ᵃ and 131ᵃ represent two pairs of fingers having outer hooked ends and pivoted respectively to the extremities of cross heads 130 and 130ᵃ. The hooked ends of said fingers are normally kept spread apart or extended by the springs 132 and 132ᵃ encircling, respectively, the bases or butts of fingers 131—131 and 131ᵃ—131ᵃ.

134 and 134ᵃ represent cone members loosely mounted on the shafts 129 and 129ᵃ, respectively.

135 and 135ᵃ are vertical connecting levers which are attached to cones 134 and 134ᵃ, respectively, and extend downwardly through table A where they are respectively attached to racks 136 and 136ᵃ, which racks are mounted to slide horizontally from table A. Rack 136 is provided with a downwardly projecting ear 137 to which are pivoted the twin links 138—138 whose other ends are pivoted to the upper arm of bell crank lever 139 whose angle is pivoted on transverse shaft 49. The lower arm of bell crank lever 139 is provided with a roller 140 which travels in cam groove 141 in the face of disk 142 rigidly mounted on shaft 1.

143 is an idle gear journaled from the table A by means of short vertical shaft 144, and intermeshing with racks 136 and 136ᵃ, so that the longitudinal motion imparted to rack 136 from shaft 1 is imparted in turn in a reverse direction to the other rack 136ᵃ. It is thus evident that by the revolution of shaft 1 the cam members 134 and 134ᵃ are caused to alternately approach toward and retreat from each other. The advancing of the cones 134 and 134ᵃ cause the same to enter between the butts of fingers 131—131 and 131ᵃ—131ᵃ, respectively, forcing said butts apart and causing the outer hooked ends of said fingers to approach each other to engage the ends of the paper wrapper, $b^1$, which when the kiss is delivered to the twisters is simply folded laterally about the kiss, $a^1$, so that the rotation of the shaft 129 and 129ᵃ, on which said fingers are mounted, serves to twist the ends of said wrapper as shown in the finished kiss illustrated in Fig. 19. When said cones have entered as far as possible between the butts of said fingers, the continued forward movement of said cones serve to force the shafts 129 and 129ᵃ toward each other sufficiently to compensate for the shortening of the paper due to the twisting operation, thus avoiding tearing the paper. The retraction of said cones, caused by the movement of the racks, 136 and 136ᵃ, causes them to retreat from between the butts of fingers 131—131 and 131ᵃ—131ᵃ, respectively, allowing the springs 132 and 132ᵃ to contract the butts of said fingers and extend the hooked ends thereof so that the completed kiss is permitted to fall down through spout 145 into a waiting receptacle. The further retreat of said cones along said shafts is prevented by the provision of pins or set screws, 146—146 on said shafts so that as said cones continue their retreat, they move with them the shafts 129 and 129ᵃ until said shafts reach their normal position.

I will now describe the means provided to impart to the twisters an intermittent rotation in a constant direction. As the mechanism applied to shafts 129 and 129ᵃ is identical, I will describe that applied to shaft 129.

147 is a bushing, slidably mounted on shaft 129, by means of a feather but rotating therewith, adjacent to the outer end of said shaft. 148 is a cam surface on said bushing provided with a shoulder 149.

150 is a gear loosely mounted on shaft 129 and 151 is a disk fixed to said gear and provided with a spring pawl 152 which is adapted to engage shoulder 149 on bushing 147.

153 is a vertical rack passing down through the table A and pivoted at its lower end to a pitman rod 154, (Figs. 3 and 5,) which is pivoted by means of an eccentrically placed wrist pin on the disk 155 mounted rigidly on the end of longitudinal shaft 4. It is evident that the rack 153 will be reciprocated by the rotation of shaft 4. A sleeve or guide, 156 mounted on table A, is provided to retain rack 153 in proper alinement. It is also evident that the upward motion of rack 153 will rotate the loose gear 150 and by means of the pawl the bushing 147 and with it the twister shaft 129, thus rotating the fingers 131 and 131. However, the downward movement of said rack will not rotate said shaft 129 in a reverse direction from the above, since, in such case the pawl 152 will simply trail over the cam surface of the bushing 147 without engaging the same or rotating it. Intermittent rotation in a constant direction is thus imparted to said shaft 129.

The operation of my machine is as follows:—A roll of paper, 37, is mounted on brackets 38—38, and the loose end, $b$, of the paper introduced under roll 39 and worked through rolls 42 and 42ᵃ by means of hand wheel 52; thence said paper is led under roll 53 and over roll 77 and between rolls 59 and 59ᵃ through which rolls it is worked by means of hand wheel 62. Thence said paper is led between stripper plates 78 and 79, and blades 82 and 83, out upon parallel plates 81—81 into the zone of the candy knife 21. The candy strip $a$ is worked through rolls 13 and 13ᵃ by means of the hand lever 15ᵃ until it reaches the zone of the candy cutting mechanism, C. The machine is now put into general operation by the application of power to shaft 1. The pivoted blade 83 descends into engagement with fixed blade 82, shearing from the paper, $b$, a square or section of the proper size to form a wrapper, and the knife 21 descends and cuts from the candy strip $a$ a section or kiss, $a^1$, of the desired length, which section is stripped from the knife 21 by the stripper plate $33^a$ which, as described, lags behind the knife in its ascent. The kiss, $a^1$, laid on its wrapper, $b^1$, now drops down between the parallel plates 81—81, which act to turn upwardly into a vertical plane the lateral edges of the wrapper, $b^1$, onto the perimeter of the oscillating disk 90, resting against either the shoulder 92 or $92^a$, as the case may be. Assuming that the shoulder 92 is above, as soon as the kiss is deposited on the disk, the wheel 101 has oscillated sufficiently to extend the standard 104, and with it its fingers 107—107 which extend through the apertures 108—$108^a$ and grasp the kiss and its wrapper. The disk 90 is now oscillating toward the right in Fig. 11, toward the right hand twisters, G—G. The oscillating folder 124, which moves more rapidly than the disk 90 owing to the interposition of small gear 119 in its operating mechanism, overtakes the candy kiss and folds the rear lateral edge of the wrapper down over the top of the kiss, as shown at $a^2$, $b^2$, in Fig. 11. As the kiss enters the zone of the fixed folder 126, the oscillating folder 124 begins to retreat in the other direction and the forward lateral edge of the paper wrapper, which up to this time has remained vertical, as turned up by the plate 81, is engaged by the edge of the fixed folder 126 and folded down over the top of the kiss as shown at $a^3$, $b^3$, in Fig. 11. When the kiss has reached the zone of the twisters G—G, at the left of Fig. 11, the fingers 131—131 and $131^a$—$131^a$ of the twisters close together, clasping the untwisted ends of the wrapper. The fingers 107—107 are now retracted by the rotation of wheel 101 so that the kiss is supported by the twisters but prevented from turning with the twisters by the fixed folder 126. The shafts 129 and $129^a$, on the left side of the machine are now rotated and the ends of the paper wrapper twisted into substantially the form shown in Fig. 19, the twisters being advanced toward each other by means of cone members 134 and $134^a$ to compensate for the shortening of the paper ends by twisting. When the rotation of the twisters cease, the retreat of the cone members 134 and $134^a$, along the shafts 129 and $129^a$, respectively, permit the springs 132 and $132^a$ to spread the fingers 131—131 and $131^a$—$131^a$, respectively so as to release the completed kiss and permit it to drop down spout 145 into a waiting receptacle. While the disk 90 is delivering a kiss to the twisters G—G on the left side of the machine, a second kiss is being received from between the plates 81—81 on the perimeter of the disk 90 adjacent to the shoulder $92^a$, and as the disk 90 is rotated in the reverse direction to that above described, the second kiss is folded by oscillating folder 124 and fixed folder 126 and delivered to be twisted to the twisters G—G on the right of the machine as shown in Fig. 11. The operation is identical with that described above in connection with kiss $a^1$, $a^2$, $a^3$. It is thus evident that the disk delivers a folded kiss alternately to the twisters at either side of the machine. The candy cutting and paper shearing mechanisms are timed to deliver to the candy disk a kiss, $a^1$ on a wrapper $b^1$, at the instant a shoulder, 92 or $92^a$, reaches its highest point and the step by step candy and paper feeding mechanisms are timed to furnish the proper lengths of candy and paper to the cutting and shearing mechanisms at the proper moments. It is thus evident that the machine is continuous in its operation and works with great rapidity and accuracy.

If desired, the twisters G—G may be omitted and folders substituted which will serve to fold instead of twist the ends of the wrapper, as in caramel work. By providing sufficient capacity in the various portions of the mechanism, stick candy may be cut and wrapped successfully.

Many other minor changes and variations will suggest themselves to those skilled in the art, all of which, however, are within the scope of my invention.

Although, for the sake of clearness, I have minutely described the embodiment of the invention illustrated in the accompanying drawings, I do not wish to limit myself thereby but claim broadly:—

1. In a candy machine, an oscillating disk adapted to receive the candy pieces superimposed on their wrappers and deliver them alternately to either side of the machine, and means coöperating with said disk for folding the wrappers about said pieces.

2. In a candy machine, a disk adapted to receive the candy pieces superimposed on their wrappers on its periphery; means for oscillating said disk, means coöperating with said disk for folding the wrappers about said pieces, and means adapted to receive the pieces from said disk and complete their inclosure.

3. In a candy machine, a disk adapted to receive the candy pieces superimposed on their wrappers upon its periphery and deliver the same alternately to either side of the machine, means coöperating with said disk for folding the wrappers about said pieces, and duplicate means at either side of said disk adapted to alternately receive a candy piece from said disk and complete its inclosure.

4. In a candy machine, means adapted to receive the candy pieces superimposed upon their wrappers and fold the lateral edges of the wrappers up vertically, a disk adapted to receive said pieces from said first named means upon its periphery, means for oscillating said disk, and folding mechanism coöperating with said disk to fold the lateral edges of the wrappers down upon the candy pieces.

5. In a candy machine, means adapted to receive the candy pieces superimposed on their wrappers and fold the lateral edges of the wrappers up vertically, a disk adapted to receive said pieces from said first mentioned means upon its periphery, means for oscillating said disk, folding mechanism coöperating with said disk to fold the lateral edges of the wrappers down upon the pieces, and means adapted to receive the pieces from said disk and complete their inclosure.

6. In a candy machine, means adapted to receive the candy pieces superimposed on their wrappers and fold the lateral edges of the wrappers up vertically, an oscillating disk adapted to receive the pieces from said first mentioned means and deliver them alternately to either side of the machine, folding mechanism coöperating with said disk to fold the lateral edges of the wrappers down upon the pieces, and duplicate means at either side of said disk adapted to alternately receive a piece from said disk and complete its inclosure.

7. In a candy machine, a disk adapted to receive the candy pieces superimposed upon their wrappers upon its periphery, means for oscillating said disk, and an oscillating folder and a fixed folder coöperating with said disk to fold the wrappers about the pieces.

8. In a candy machine, a disk adapted to receive the candy pieces superimposed on their wrappers upon its periphery, means for oscillating said disk, an oscillating folder and a fixed folder coöperating with said disk to fold the wrappers about said pieces, and means adapted to receive the pieces from the disk and complete their inclosure.

9. In a candy machine, a disk adapted to receive the candy pieces superimposed on their wrappers upon its periphery and deliver said pieces alternately at either side of the machine, a fixed folder on either side of said disk, an oscillating folder coöperating with said disk and said fixed folders to fold the lateral edges of the wrappers down upon said pieces, and duplicate means at either side of said disk adapted to alternately receive a piece from said disk and complete its inclosure.

10. In a candy machine, means for folding the lateral edges of the wrapper up vertically against the candy piece, a disk adapted to receive the piece from said first mentioned means upon its periphery, means for oscillating said disk, and an oscillating folder and a fixed folder coöperating with said disk to fold the lateral edges of the wrapper down upon said piece.

11. In a candy machine, means for folding the lateral edges of the wrapper up vertically, a disk adapted to receive the candy piece superimposed upon its wrapper upon its periphery from said first mentioned means, means for oscillating said disk, an oscillating folder and a fixed folder coöperating with said disk to fold the lateral edges of the wrapper down upon said piece, and means adapted to receive said piece from said disk and complete its inclosure.

12. In a candy machine, means for folding the lateral edges of the wrapper down upon the candy pieces, an oscillating disk adapted to receive the pieces from said first mentioned means upon its periphery and deliver them alternately to either side of the machine, a fixed folder on either side of said disk, an oscillating folder coöperating alternately with said fixed folders to fold the lateral edges of the wrappers down upon the pieces, and duplicate means on either side of said disk adapted to alternately receive a piece and complete its inclosure.

Signed at Pittsburg, Penna., this 25 day of February, 1909.

WILLIAM J. PENDLEBERRY.

Witnesses:
　　THOS. E. FINLEY,
　　E. A. LAWRENCE.